US009055473B2

(12) United States Patent
Maheshwari et al.

(10) Patent No.: US 9,055,473 B2
(45) Date of Patent: *Jun. 9, 2015

(54) DETERMINATIVE SEGMENTATION RESEGMENTATION AND PADDING IN RADIO LINK CONTROL (RLC) SERVICE DATA UNITS (SDU)

(71) Applicant: QUALCOMM Incorporated, San Diego, CA (US)

(72) Inventors: Shailesh Maheshwari, San Diego, CA (US); Saiyiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 13/794,451

(22) Filed: Mar. 11, 2013

(65) Prior Publication Data

US 2014/0105227 A1    Apr. 17, 2014

Related U.S. Application Data

(63) Continuation of application No. 12/414,432, filed on Mar. 30, 2009, now Pat. No. 8,396,083.

(60) Provisional application No. 61/041,201, filed on Mar. 31, 2008.

(51) Int. Cl.
  *H04J 3/24*   (2006.01)
  *H04W 28/06*  (2009.01)
(52) U.S. Cl.
  CPC ............ *H04W 28/065* (2013.01); *H04W 28/06* (2013.01)
(58) Field of Classification Search
  CPC ................................................. H04W 28/065
  See application file for complete search history.

(56) References Cited

U.S. PATENT DOCUMENTS 7,675,941 B2  3/2010  Kim et al.
7,860,065 B2  12/2010 Oishi et al.
(Continued)

FOREIGN PATENT DOCUMENTS

CN    1322424 A      11/2001
JP    2002527945 A    8/2002
(Continued)

OTHER PUBLICATIONS

"3GPP TS 36.321 V8.1.0 (Mar. 2008); 3rd Generation Partnership Project; Technical Specification Group Radio Access Network; Evolved Universal Terrestrial Radio Access (E-UTRA) Medium Access Control (MAC) protocol specification (Release 8)" 3rd Generation Partnership Project (3GPP); TS 36.321 V8.1.0 (Mar. 2008), pp. 22-27.

(Continued)

*Primary Examiner* — Kibrom T Hailu
(74) *Attorney, Agent, or Firm* — Anthony R. Morris

(57) ABSTRACT

A transmission entity (e.g., user equipment (UE)) is expected to reduce the segmentation of Radio Link Control (RLC) Service Data Units (SDUs) while also minimizing padding. Signaling or provisioning of a constraint value such as a maximum padding amount or minimum segmentation size is employed in a determinative way in the UE to balance these objectives. A receiving entity (e.g., evolved base node (eNB)) benefits from being able to signal these parameters, whose application to RLC instances can discriminate between data and signaling radio bearers. Compliance can also be voluntary, such as the network entity employing at least a portion of the same approach on the downlink.

24 Claims, 9 Drawing Sheets

(56) References Cited

U.S. PATENT DOCUMENTS

| | | |
|---|---|---|
| 8,396,083 B2 | 3/2013 | Maheshwari et al. |
| 2004/0062275 A1* | 4/2004 | Siddabathuni ............... 370/474 |
| 2006/0251067 A1 | 11/2006 | DeSanti et al. |
| 2008/0144556 A1 | 6/2008 | Rinne |
| 2008/0186946 A1* | 8/2008 | Marinier et al. ............. 370/349 |
| 2009/0034507 A1 | 2/2009 | Chang et al. |
| 2009/0086659 A1 | 4/2009 | Pani et al. |
| 2009/0190526 A1 | 7/2009 | Pani et al. |
| 2009/0190527 A1 | 7/2009 | Marinier et al. |

FOREIGN PATENT DOCUMENTS

| | | |
|---|---|---|
| JP | 2006025305 A | 1/2006 |
| JP | 2009502093 A | 1/2009 |
| RU | 2316906 C2 | 2/2008 |
| WO | 0021253 A1 | 4/2000 |
| WO | 2005053170 A2 | 6/2005 |
| WO | 2007011298 A1 | 1/2007 |

OTHER PUBLICATIONS

International Search Report—PCT/US09/039014, International Search Authority—European Patent Office—Jul. 31, 2009.
MAC Rapporteurs (QUALCOMM Europe et al.), 3GPP Draft; Internal R2-082902 CR0002R1 to 36.321-8.1.0 WITHHL, 3RD Generation Partnership Project (3GPP), May 5-9, 2008, XP050139843.
Taiwan Search Report—TW098110728—TIPO—Apr. 24, 2012.
Written Opinion—PCT/US09/039014, International Search Authority—European Patent Office—Jul. 31, 2009.

* cited by examiner

DETERMINATIVE SEGMENTATION RESEGMENTATION AND PADDING IN RADIO LINK CONTROL (RLC) SERVICE DATA UNITS (SDU)

CROSS-REFERENCE

This is a continuation application of U.S. application Ser. No. 12/414,432, filed Mar. 30, 2009, granted as U.S. Pat. No. 8,396,083 with an issue date of Mar. 12, 2013, which claims priority to Provisional Application No. 61/041,201, entitled METHOD AND APPARATUS FOR MINIMIZING SEGMENTATION/RE-SEGMENTATION/PADDING IN LTE, filed Mar. 31, 2008, both assigned to the assignee hereof and each of which is hereby expressly incorporated by reference herein in its entirety.

FIELD OF INVENTION

The exemplary and non-limiting aspects described herein relate generally to wireless communications systems, methods, computer program products and devices, and more specifically to techniques for a determinative technique for segmenting, re-segmenting and padding radio link control (RLC) service data units (SDU).

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers which make up the UMTS core network. This communications network can carry many traffic types from real-time Circuit Switched to IP based Packet Switched. The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node Bs. Despite the fact that they do not have to be physically separated, there is a logical interface between them known as the Iub. The RNC and its corresponding Node Bs are called the Radio Network Subsystem (RNS). There can be more than one RNS present in an UTRAN.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

An objective under LTE is to reduce segmentation of Radio Link Control (RLC) SDUs when building packet data units (PDUs). Another objective is to reduce the padding, which is in tension with the other objective. Unspecified behavior in segmenting and padding can complicate and render less efficient decoding of the PDUs that unpredictably include segmenting of SDUs or padding.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with balancing objectives of minimizing segmentation of RLC SDUs while reducing padding of PDUs built from the SDUs.

In one aspect, a method is provided for building packet data units (PDUs), by receiving and storing service data units (SDUs), accessing a length value for a PDU to be built and a constraint value, sequentially assembling stored SDUs without exceeding the length value, and determining to perform one of segmenting a last SDU and padding the PDU to reach the length value based upon comparing a remaining portion of the PDU to the constraint value.

In another aspect, at least one processor is provided for building packet data units (PDUs). A first module receiving and stores service data units (SDUs). A second module accesses a length value for a PDU to be built and a constraint value. A third module for sequentially assembling stored SDUs without exceeding the length value. A fourth module determines to perform one of segmenting a last SDU and padding the PDU to reach the length value based upon comparing a remaining portion of the PDU to the constraint value.

In an additional aspect, a computer program product is provided for building packet data units (PDUs). A computer-readable storage medium comprises a first set of codes for causing a computer to receive and store service data units (SDUs). A second set of codes causes the computer to access a length value for a PDU to be built and a constraint value. A third set of codes causes the computer to sequentially assemble stored SDUs without exceeding the length value. A fourth set of codes causes the computer to determine to perform one of segmenting a last SDU and padding the PDU to reach the length value based upon comparing a remaining portion of the PDU to the constraint value.

In another additional aspect, an apparatus is provided for building packet data units (PDUs). Means are provided for receiving and storing service data units (SDUs). Means are provided for accessing a length value for a PDU to be built and a constraint value. Means are provided for sequentially assembling stored SDUs without exceeding the length value. Means are provided for determining to perform one of segmenting a last SDU and padding the PDU to reach the length value based upon comparing a remaining portion of the PDU to the constraint value.

In a further aspect, an apparatus is provided for building packet data units (PDUs). A memory receives and stores service data units (SDUs). A computing platform accesses a length value for a PDU to be built and a constraint value. The computing platform sequentially assembles stored SDUs without exceeding the length value. The computing platform determines to perform one of segmenting a last SDU and padding the PDU to reach the length value based upon comparing a remaining portion of the PDU to the constraint value.

In yet one aspect, a method is provided for decoding packet data units (PDUs) by wirelessly receiving and storing a packet data unit (PDU) from a transmitting entity, and deterministically decoding segmentation and padding of service data units (SDUs) by predicting operation of a transmitting entity. The transmitting entity is known to have built the PDU by receiving and storing service data units (SDUs), accessing a length value for a PDU to be built and a constraint value, sequentially assembling stored SDUs without exceeding the length value, and determining to perform one of segmenting a last SDU and padding the PDU to reach the length value based upon comparing a remaining portion of the PDU to the constraint value.

In yet another aspect, at least one processor is provided for decoding packet data units (PDUs). A first module wirelessly receives and stores a packet data unit (PDU) from a transmitting entity. A second module deterministically decodes segmentation and padding of service data units (SDUs) by predicting operation of a transmitting entity. The transmitting entity is known to have built the PDU by receiving and storing service data units (SDUs), accessing a length value for a PDU to be built and a constraint value, sequentially assembling stored SDUs without exceeding the length value, and determining to perform one of segmenting a last SDU and padding the PDU to reach the length value based upon comparing a remaining portion of the PDU to the constraint value.

In yet an additional aspect, a computer program product is provided for decoding packet data units (PDUs). A computer-readable storage medium comprises a first set of codes for causing a computer to wirelessly receive and store a packet data unit (PDU) from a transmitting entity. A second set of codes causes the computer to deterministically decode segmentation and padding of service data units (SDUs) by predicting operation of a transmitting entity. The transmitting entity is known to have built the PDU by receiving and storing service data units (SDUs), accessing a length value for a PDU to be built and a constraint value, sequentially assembling stored SDUs without exceeding the length value, and determining to perform one of segmenting a last SDU and padding the PDU to reach the length value based upon comparing a remaining portion of the PDU to the constraint value.

In yet another additional aspect, an apparatus is provided for decoding packet data units (PDUs). Means are provided for wirelessly receiving and storing a packet data unit (PDU) from a transmitting entity. Means are provided for deterministically decoding segmentation and padding of service data units (SDUs) by predicting operation of a transmitting entity. The transmitting entity is known to have built the PDU by receiving and storing service data units (SDUs), accessing a length value for a PDU to be built and a constraint value, sequentially assembling stored SDUs without exceeding the length value, and determining to perform one of segmenting a last SDU and padding the PDU to reach the length value based upon comparing a remaining portion of the PDU to the constraint value.

In yet a further aspect, an apparatus is provided for decoding packet data units (PDUs). A receiver wirelessly receives a packet data unit (PDU) from a transmitting entity. A memory stores the PDU. A computing platform deterministically decodes segmentation and padding of service data units (SDUs) by predicting operation of a transmitting entity. The transmitting entity is known to have built the PDU by receiving and storing service data units (SDUs), accessing a length value for a PDU to be built and a constraint value, sequentially assembling stored SDUs without exceeding the length value, and determining to perform one of segmenting a last SDU and padding the PDU to reach the length value based upon comparing a remaining portion of the PDU to the constraint value.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
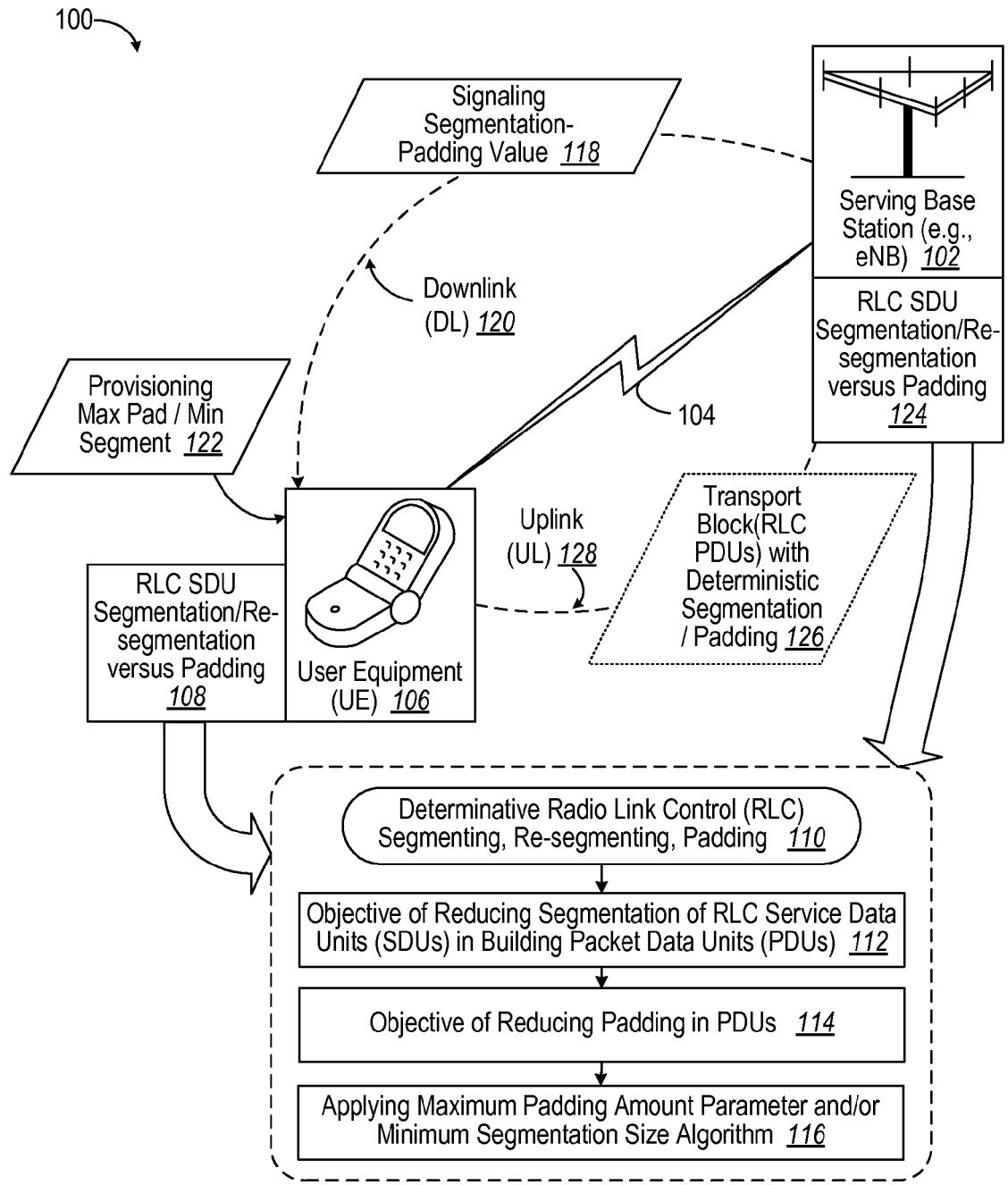
FIG. 1 illustrates a block diagram of a communication system wherein a transmitting entity performs radio link control (RLC) sub layer segmenting or padding of service data units (SDUs) in building packet data units (PDUs) in a deterministic, balanced approach.

Referring initially to FIG. 1, a communication system 100 of a base station, depicted as an evolved base node (eNB) 102, communicates via an over-the-air (OTA) link 104 with user equipment (UE) 106. In an illustrative aspect, the UE 106 builds packet data units (PDUs) from Radio Link Control (RLC) sub layer service data units (SDUs). In particular, an RLC SDU component 108 uses a determinative RLC segmenting, re-segmenting and padding methodology or sequence of operations (block 110) that balances an objective of reducing segmentation of RLC SDUs in building (block 112) with an objective of reducing padding in PDUs (block 114) by applying a maximum padding amount parameter and/or a minimum segmentation size parameter (block 116). In addition, value can be presented as a percentage or fraction of length that is segmented.

The eNB 102 can signals by radio resource control segmentation and/or padding values (block 118) on a downlink (DL) 120. These values can be specific to RLC instances of data radio bearers or signaling radio bearers. Alternatively, these values can be provisioned in advance, either for mandatory or voluntary compliance, as depicted at 122. The eNB 102 has an RLC SDU component 124 that is knowledgeable of the methodology or sequence of operations 110 such that the eNB 102 can determinatively predict how the UE 106 segments and/or pads the wirelessly transmitted PDUs 126 on an uplink (UL) 128 to the eNB 102. It should be appreciated with the benefit of the present disclosure that a transmission entity (e.g., UE 106) may consider all lower layers (e.g., RLC/MAC) header overhead before concluding whether SDU needs to be segmented or not for a given grant.

Figure 2:
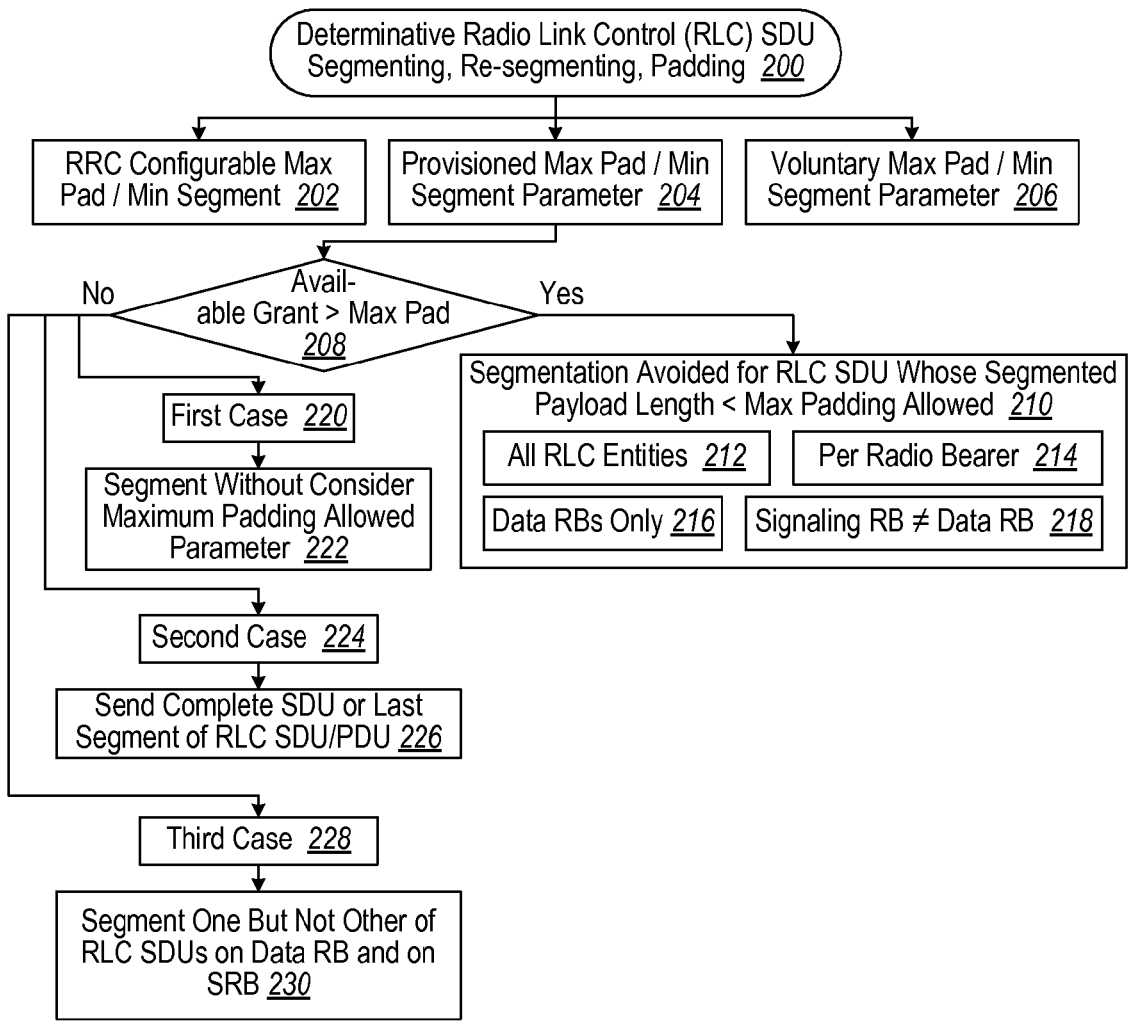
FIG. 2 illustrates a flow diagram of a methodology or sequence of operations for deterministic segmentation, re-segmentation and padding.

In an illustrative aspect depicted in FIG. 2, a methodology or sequence of operation 200 advantageously enables a transmitting Radio Link Control (RLC) entity (e.g., user equipment (UE)) to reduce segmentation of RLC Service Data Units (SDUs) while minimizing padding. These two objectives are in tension with each other. Avoiding segmentation can result in padding ranging from 1 byte to 1499 bytes (IP Frame size). Thus, an opportunity exists for balancing these two objectives for increased processing efficiency, especially in a deterministic fashion enabling a receiving RLC entity (e.g., eNB) to more readily reassemble the RLC SDUs without undue loss of over-the-air (OTA) resources due to padding. In particular, an advantage of the present innovation is a clearly predictable the transmission side behavior on how to determine when to pad and when to segment. Thereby, transmission side avoids unnecessary segmentation and maximum number of padding is deterministic.

In first aspect depicted at 202, a configurable Radio Resource Control (RRC) parameter indicates a maximum number of bytes ("max_padding_allowed") that can be padded by UE to avoid segmentation of RLC SDUs and/or re-segmentation of re-transmitted RLC Packet Data Units (PDUs). For instance, a maximum number of bytes can be selected to 40, 80, 160, etc. bytes. This value can also be determined based upon a provisioned or selected minimum segmentation size ("minimum_segmentation_size") such as values 40, 80, 160, etc.

In a second aspect depicted at 204, the transmitting entity (e.g., UE) can be provisioned with a constant that indicates the maximum number of bytes (max_padding_allowed) or minimum segmentation size (minimum_segmentation_size) in bytes which UE can pad/segment in order to avoid unwanted segmentations. In some instances, a configurable RRC parameter can override this provisioned parameter. This constant can save UE from doing unnecessarily segmentation of IP frames for grants that are not in line with the SDU sizes. Different or identical parameters can be imposed upon signaling and data radio bearer (RBs). In one aspect, this constant can also be specified in terms of percentage of RLC SDU to be segmented or already segmented SDU. Combination of percentage and max_padding_allowed parameters can be used to determine whether to segment an RLC SDU (or segmented RLC PDU) or not.

In a third aspect depicted at 206, these provisioned values can be non-mandatory, such as when the transmitting entity can choose to follow parameters to avoid segmentation for a lower grant case for an RLC instance. In some instances, this voluntary implementation can be applicable one or both sides of a communication link (e.g., network and UE). For example, the network can employ a method that is the same or similar to a UE that is signaled or provisioned to comply with such parameters.

Figure 3:
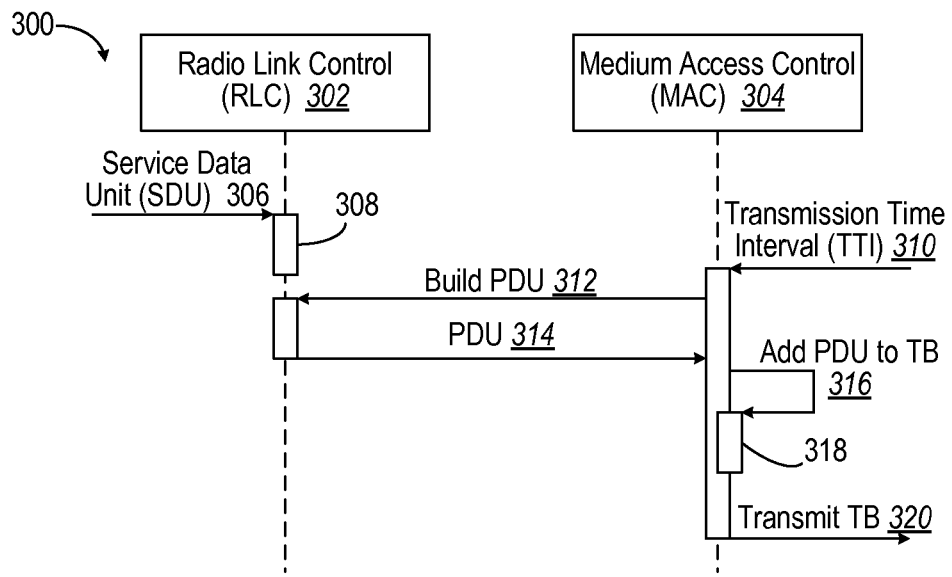
FIG. 3 illustrates a timing diagram of medium access control (MAC)-initiated RLC-MAC interaction.

Based upon the configurable RRC parameter (block 202), the provisioned constant(s) (block 204) or voluntary implementation (206), then a determination is made in block 208 whether an available grant for an RLC instance is more than max_padding_allowed parameter. If so, then UE should avoid segmentation of RLC SDU whose segmented payload length is less than max_padding_allowed bytes (block 210). This parameter can be either for all the RLC entities (block 212) or can be per radio bearer (RB) basis (block 214), may be valid only for data RB (block 216), or can take different value for signaling and data RBs (block 218). Else, if in block 208 the available grant for an RLC instance is less than max_padding_allowed parameter, then in a first optional implementation depicted at 220, the UE segments according to the grant without taking into account max_padding_allowed parameter or similar parameter (block 222). In a second optional implementation depicted 224 performed alternatively to or in addition to the first optional implementation 220, UE sends only complete SDUs or last segment of the RLC SDU/PDU whenever the grant is smaller than max_padding_allowed parameter (block 226). Examples of such use can be VoIP traffic, control PDUs or last segment of the segmented RLC SDU/PDU, etc. In a third optional implementation depicted at 228 performed alternatively or in addition to implementations 220, 224, UE can be configured to not segment RLC SDUs on data RB but segmenting Signaling Radio Bearer (SRB) or vice versa (block 230). By virtue of the forgoing, the network gain control over maximum padding expected from the UE, avoiding too much segmentation. further, the above described options 220, 224, 228 can help transmission entity (e.g., UE) to avoid segmentation of SDU into very small chunks and at the same time minimize padding In FIG. 3, a MAC-initiated RLC/MAC interaction operation 300 that benefits from determinative segmenting, re-segmenting and padding is depicted as Layer 2 for an illustrative implementation for E-UTRA (Evolved Universal Mobile Telecommunications System Terrestrial Radio Access). At the PDCP (Packet Data Convergence Protocol) sub-layer, there is one PDCP object per logical channel. The RLC sub-layer has one RLC object per UE at both the UE and the eNB (evolved base node) node while the MAC (medium access control) sub layer has one MAC object per UE on the UE node and one MAC object for all UEs on the eNB.

With regard to Radio Link Control (RLC), each RLC object can handle up to 16 uplink and downlink streams simultaneously. The RLC sub layer uses dynamic PDU size to build each PDU accordingly to the requested size by the lower layer. Each PDU can have multiple SDU s and segmentation of SDUs and padding are supported. Main services provided by the RLC sub layer to upper layers: (a) in sequence delivery of upper layer PDUs; and (b) transfer of upper layer PDUs supporting UM (unacknowledged mode). Main services provided by the RLC sub layer to lower layers are dynamic PDU size. Main functions are (a) duplicate detection; (b) segmentation for dynamic PDU size with no need for padding; and (c) concatenation of SDU s for the same radio bearer.

Incoming data is processed and handed over in a linear fashion from layer to layer. The interaction between RLC and PDCP sub layer works in the same way when transmitting data. The interface between the RLC 302 and the MAC sub layer 304 is more complicated though as the MAC sub layer 304 only delivers data down to the PHY sub layer a predefined number of times each TTL (transmission time interval).

Between the RLC 302 and MAC sub layer 304, all of the RLC SDUs (service data units) 306 are queued as depicted at 308 at the RLC sub layer 302 and let the MAC 304 decide when it is time to build PDUs (packet data units) from them, depicted as triggered by TTI timer 310. The MAC 304 requests PDUs 312 from the RLC sub layer 302 when it is scheduled to transmit. Since the RLC 304 has all the SDU s 306 on queue 308 it takes as much data as possible up to the defined size specified by the MAC sub layer 304 in the request 312 and builds a PDU 314 out of it. The MAC sub layer 304 can then after receiving each PDU 314 decide to request more PDUs 316 or add padding if there is more space left in the transport block (TB) 318. Then the TB is transmitted as depicted 320.

Figure 4:
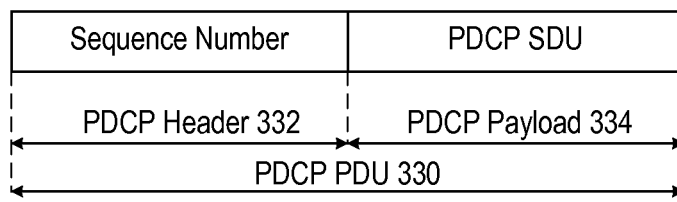
FIG. 4 illustrates a data structure for Packet Data Convergence Protocol (PDCP) packet data unit (PDU).

In FIG. 4, Packet Data Convergence Protocol (PDCP) PDU 330 is depicted. The PDCP sub layer transfers data between the RLC sub layer and the node object. When receiving data from the node object, a PDCP header 332 is added to PDCP payload 334 (PDCP SDU) consisting of a two byte long sequence number before delivering the packet to the RLC sub layer. When data is delivered from the RLC sub layer to the PDCP sub layer the PDCP header is removed before the packet is delivered to the node object.

Figure 5:
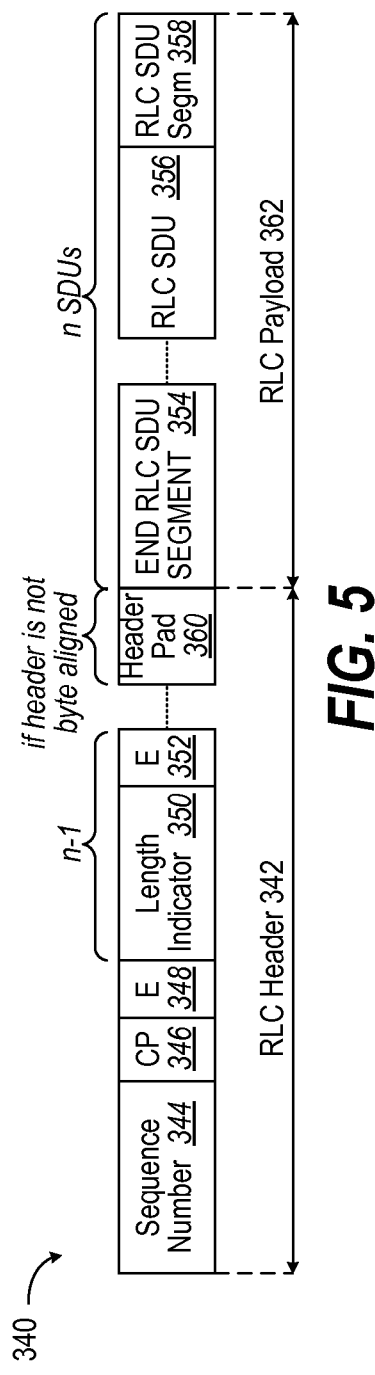
FIG. 5 illustrates a data structure for RLC PDU structure with segmentation and padding.

In FIG. 5, an RLC PDU Structure 340 is depicted. An RLC header 342 consists of a Sequence Number 344, Complete/Partial (CP) field 346 and an Extension bit (E) 348. More header fields may follow depending on the number of SDUs in each RLC PDU 340. For one SDU, these extra fields can be omitted, but for every additional SDU one Length Indicator (LI) 350 and one E bit 352 are added. The Sequence Number 344 can be used for duplicate detection and in sequence delivery to the upper layer. The Complete/Partial field 346 supports segmentation and concatenation by having a first bit that indicates if the start of the first SDU 354 is segmented while the second bit indicates if the end of the last SDU 356 is segmented. The E bit 348 indicates if more header fields follow or if the rest of the PDU consists of SDUs. If there are more header fields, an LI 350 follows to indicate where the first SDU ends and where the next SDU starts. After the LI field 350 another E bit 352 follows. There will be one LI field 350 and one E bit 352 for every SDU 356 in each RLC PDU 340 except for a last SDU 358. The length of the last SDU 358 can be calculated by subtracting the length of the RLC PDU 340 with the sum of all present LIs 350. Padding 360 is added to the RLC header 342 to byte align RLC payload 362 if needed.

Figure 6:
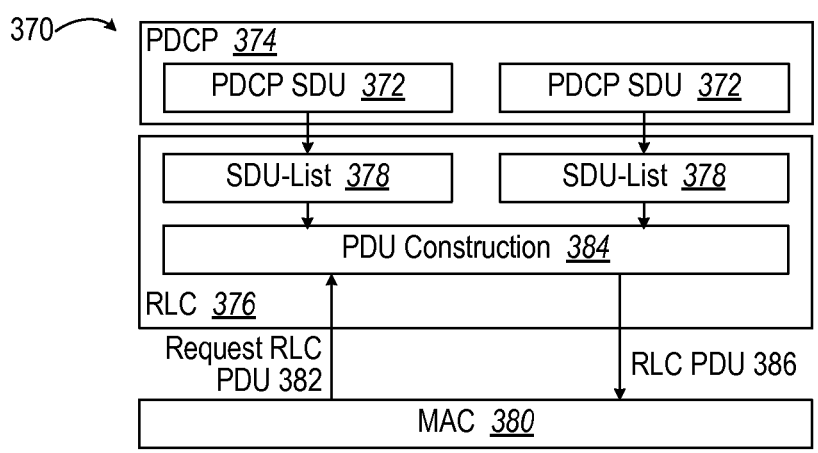
FIG. 6 illustrates a methodology or sequence of operations for RLC sub-layer for downlink.

In FIG. 6, a process 370 is depicted for building and transmission of RLC PDUs. When receiving SDUs 372 from PDCP sub layer 374, RLC sub layer 376 stores the SDUs 372 in a SDU-List 378 in the order received. Each channel in the RLC sub layer 374 has its own SDU-List 378 and works independently of each other. The SDUs 372 are buffered in the RLC sub layer 376 until MAC sub layer 380 requests data from the RLC channels 376. The MAC sub layer 380 requests data as depicted at 382 telling the RLC sub layer 376 which channel and the maximum size of the RLC PDU that can be sent to the MAC sub layer 380. If the specific RLC channel has less data in the buffer 378 than the requested size, PDU construction component 384 of the RLC channel puts all the SDUs 372 belonging to the specific channel in the same PDU 386, add a RLC header and deliver the RLC PDU to the MAC sub layer. If the specific RLC channel has enough data then a PDU of requested size is built using segmentation if needed.

Figure 7:
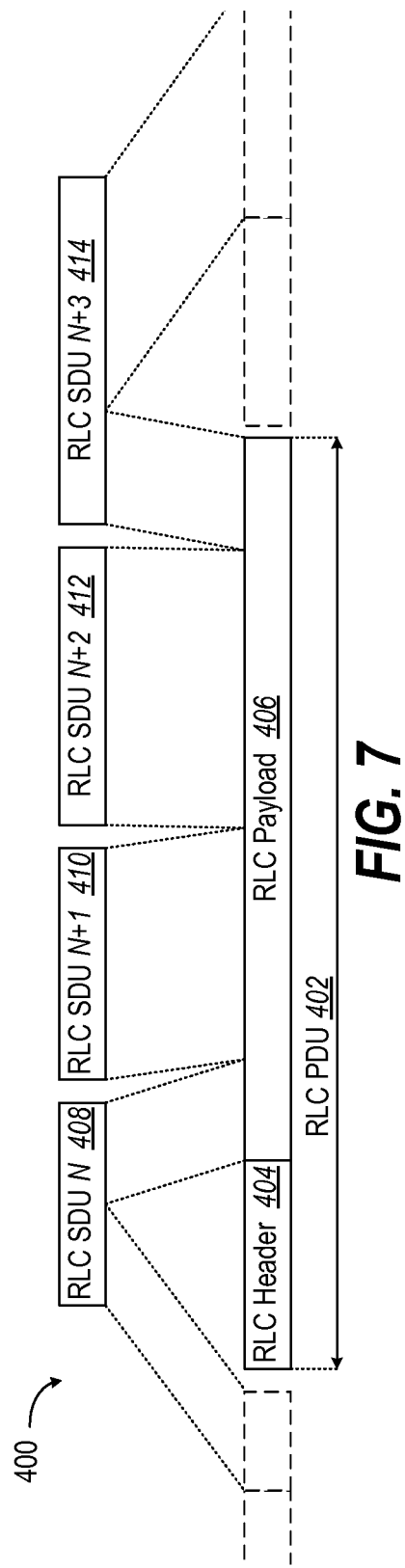
FIG. 7 illustrates a diagram of RLC SDUs segmented to fit a requested length.

In FIG. 7, a data structure 400 is depicted for segmentation when padding is not necessary to build dynamically sized RLC PDUs 402 of an RLC header 404 and RLC payload 406. When the RLC sub layer receives the requested RLC PDU length from the MAC sub layer, the RLC sub layer may have to send an end segment of an RLC SDU N 408, be able to send complete RLC SDUs N+1, N=2 410, 412, and then have to segment a final SDU 414 in the PDU 402 to comply with the requested length. Unless the last SDU fits perfectly the last SDU will be segmented or padding added as appropriate to fill the requested size.

On the receiving side (e.g., eNB), when the RLC sub layer receives a RLC PDU from the MAC sub layer, an in-sequence check is performed to guarantee in sequence delivery of SDUs to the PDCP sub layer and to rebuild segmented SDUs correctly. If the received RLC PDU is the expected RLC PDU, processing and delivery of the RLC PDU is performed. Otherwise duplicate detection is performed before the RLC PDU is put in a waiting queue. The RLC PDU is delivered from the waiting queue when all the expected RLC PDUs before it, has been received. Each RLC PDU is stored in the waiting queue for a short period of time. When a RLC PDU reach a certain age a timeout will occur, and then the expected RLC PDU is considered lost and the waiting RLC PDU(s) from the queue are delivered.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 8:
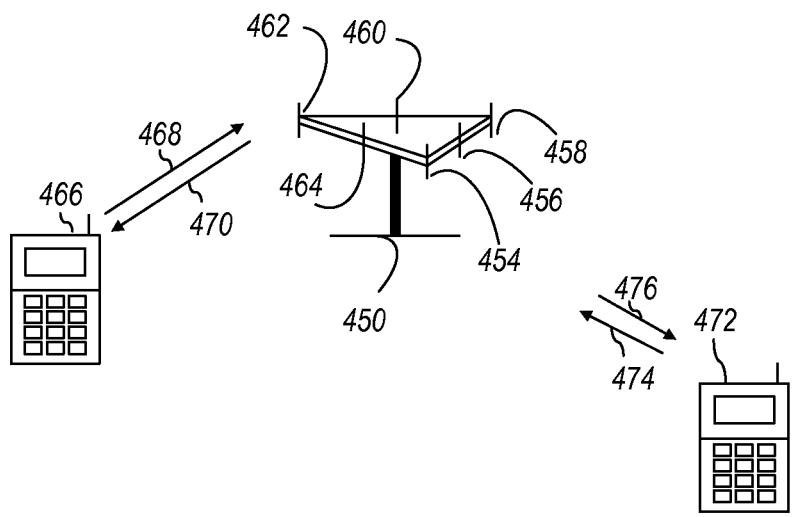
FIG. 8 illustrates a diagram of a multiple access wireless communication system according to one aspect for deterministic segmentation, re-segmentation and padding.

Referring to FIG. 8, a multiple access wireless communication system according to one aspect is illustrated. An access point 450 (AP) includes multiple antenna groups, one including 454 and 456, another including 458 and 460, and an additional including 462 and 464. In FIG. 8, only two antennas are shown for each antenna group, however, more or fewer antennas may be utilized for each antenna group. Access terminal (AT) 466 is in communication with antennas 462 and 464, where antennas 462 and 464 transmit information to access terminal 466 over forward link 470 and receive information from access terminal 466 over reverse link 468. Access terminal 472 is in communication with antennas 456 and 458, where antennas 456 and 458 transmit information to access terminal 472 over forward link 476 and receive information from access terminal 472 over reverse link 474. In a FDD system, communication links 468, 470, 474 and 476 may use different frequency for communication. For example, forward link 470 may use a different frequency then that used by reverse link 468. Each group of antennas and/or the area in which they are designed to communicate is often referred to as a sector of the access point 450. In the aspect, antenna groups each are designed to communicate to access terminals 466, 472 in a sector of the areas covered by access point 450.

In communication over forward links 470 and 476, the transmitting antennas of access point 450 utilize beamforming in order to improve the signal-to-noise ratio of forward links for the different access terminals 466 and 472. Also, an access point using beamforming to transmit to access terminals scattered randomly through its coverage causes less interference to access terminals in neighboring cells than an access point transmitting through a single antenna to all its access terminals.

An access point 450 may be a fixed station used for communicating with the terminals and may also be referred to as an access point, a Node B, or some other terminology. An access terminal 466, 472 may also be called user equipment (UE), a wireless communication device, terminal, access terminal or some other terminology.

Figure 9:
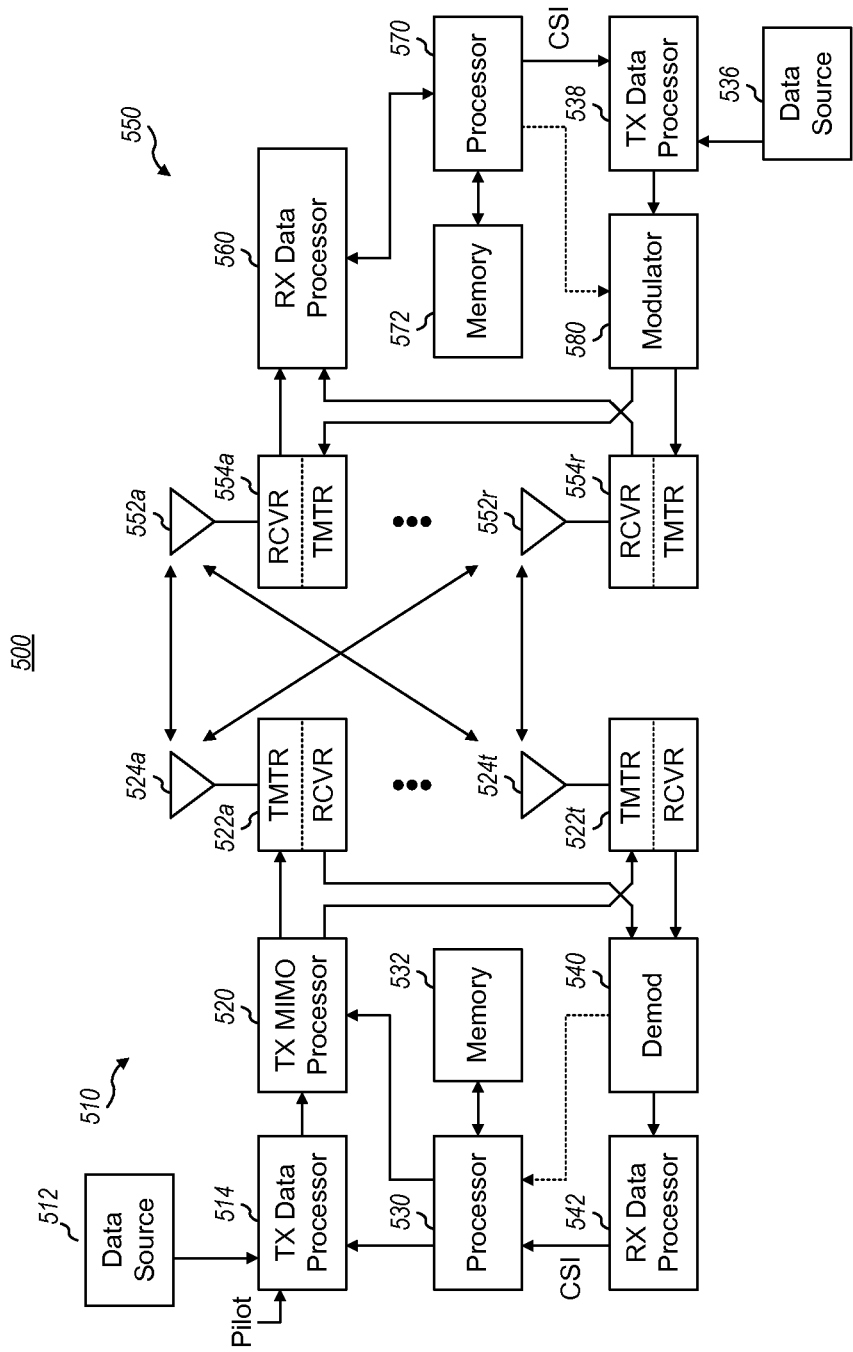
FIG. 9 illustrates a schematic block diagram of a communication system for deterministic segmentation, re-segmentation and padding.

FIG. 9 is a block diagram of an aspect of a transmitter system 510 (also known as the access point) and a receiver system 550 (also known as access terminal) in a MIMO system 500. At the transmitter system 510, traffic data for a number of data streams is provided from a data source 512 to a transmit (TX) data processor 514.

In an aspect, each data stream is transmitted over a respective transmit antenna. TX data processor 514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 530.

The modulation symbols for all data streams are then provided to a TX MIMO processor 520, which may further process the modulation symbols (e.g., for OFDM). TX MIMO processor 520 then provides $N_T$ modulation symbol streams to $N_T$ transmitters (TMTR) 522a through 522t. In certain implementations, TX MIMO processor 520 applies beamforming weights to the symbols of the data streams and to the antenna from which the symbol is being transmitted.

Each transmitter 522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 522a through 522t are then transmitted from $N_T$ antennas 524a through 524t, respectively.

At receiver system 550, the transmitted modulated signals are received by $N_R$ antennas 552a through 552r and the received signal from each antenna 552 is provided to a respective receiver (RCVR) 554a through 554r. Each receiver 554 conditions (e.g., filters, amplifies, and downconverts) a respective received signal, digitizes the conditioned signal to provide samples, and further processes the samples to provide a corresponding "received" symbol stream.

An RX data processor 560 then receives and processes the $N_R$ received symbol streams from $N_R$ receivers 554 based on a particular receiver processing technique to provide $N_T$ "detected" symbol streams. The RX data processor 560 then demodulates, deinterleaves, and decodes each detected symbol stream to recover the traffic data for the data stream. The processing by RX data processor 560 is complementary to that performed by TX MIMO processor 520 and TX data processor 514 at transmitter system 510.

A processor 570 periodically determines which pre-coding matrix to use (discussed below). Processor 570 formulates a reverse link message comprising a matrix index portion and a rank value portion.

The reverse link message may comprise various types of information regarding the communication link and/or the received data stream. The reverse link message is then processed by a TX data processor 538, which also receives traffic data for a number of data streams from a data source 536, modulated by a modulator 580, conditioned by transmitters 554a through 554r, and transmitted back to transmitter system 510.

At transmitter system 510, the modulated signals from receiver system 550 are received by antennas 524, conditioned by receivers 522, demodulated by a demodulator 540, and processed by a RX data processor 542 to extract the reserve link message transmitted by the receiver system 550.

Processor 530 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); Broadband Pilot Channel (BPICH).

Figure 10:
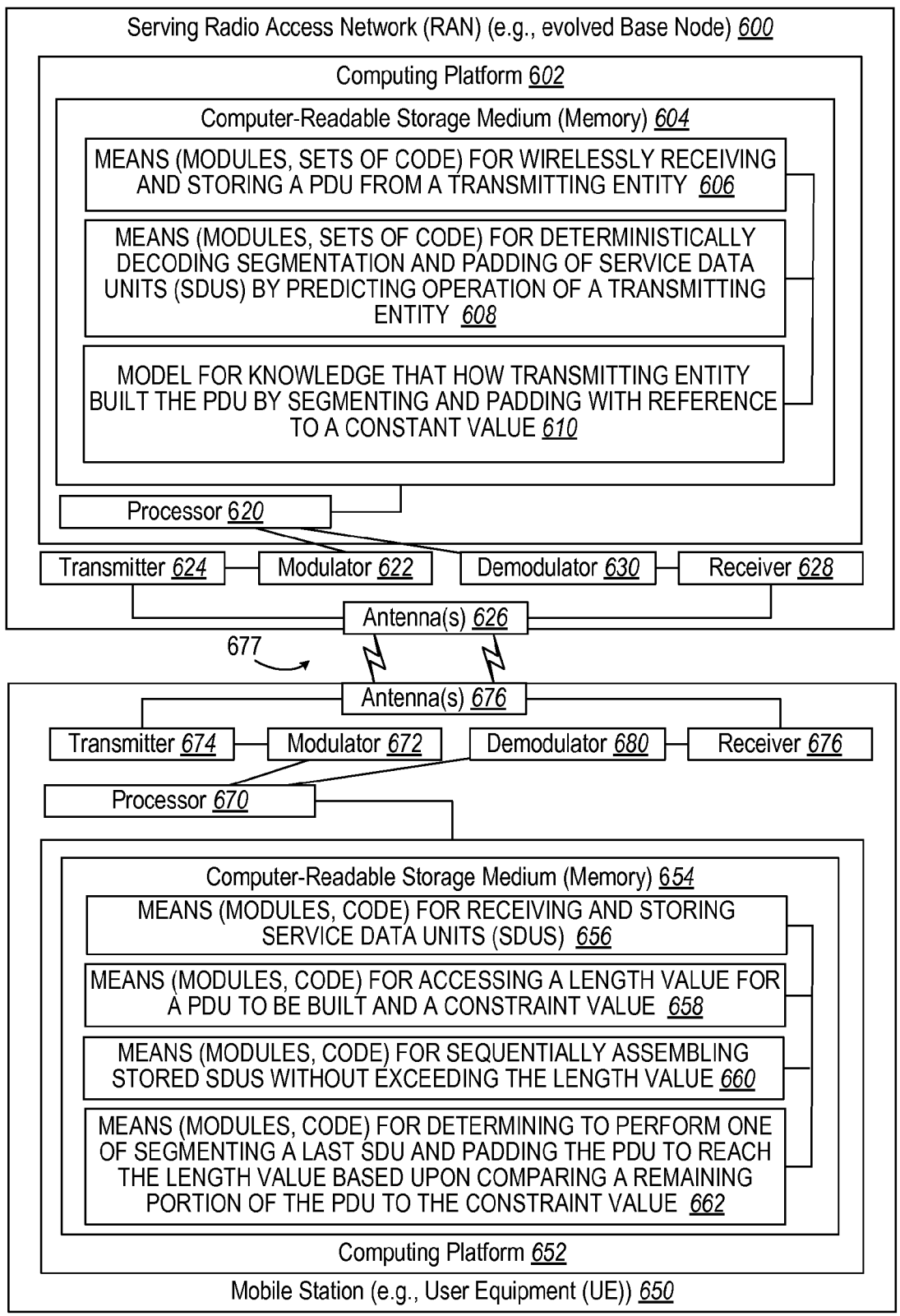
FIG. 10 illustrates a block diagram of a base station and user equipment for deterministic segmentation, re-segmentation and padding.

For the purposes of the present document, the following abbreviations apply:

3GPP Third Generation Partnership Project
AIS Automatic Identification System
AM Acknowledged Mode
AMD Acknowledged Mode Data
ARQ Automatic Repeat Request
AS Access Stratum
BCCH Broadcast Control CHannel
BCH Broadcast CHannel
BLER Block Error Rate
C- Control-
CCCH Common Control CHannel
CCH Control CHannel
CCTrCH Coded Composite Transport Channel
CDI Channel Direction Information
C-RNTI Cell Radio Network Temporary Identity
CP Cyclic Prefix
CRC Cyclic Redundancy Check
CTCH Common Traffic CHannel
DCCH Dedicated Control CHannel
DCH Dedicated CHannel
DL DownLink
DL-SCH Downlink Shared CHannel
DSCH Downlink Shared CHannel
DTCH Dedicated Traffic Channel
eNB evolved Base Node
E-UTRAN Evolved Universal Mobile Telecommunications System Terrestrial Radio Access Network
FACH Forward link Access CHannel
FDD Frequency Division Duplex
FSTD Frequency Switching Transmit Diversity
FTSTD Frequency Time Switching Transmit Diversity
HARQ 'Hybrid Automatic-Repeat-Request
HFN Hyper Frame Number
i.i.d. independent and identically distributed
L1 Layer 1 (physical layer)
L2 Layer 2 (data link layer)
L3 Layer 3 (network layer)
LI Length Indicator
LSB Least Significant Bit
LTE Long Term Evolution
MAC Medium Access Control
MBMS Multimedia Broadcast Multicast Service
MBSFN Multicast Broadcast Single Frequency Network
MCCH MBMS point-to-multipoint Control Channel
MCE MBMS Coordinating Entity
MCH Multicast CHannel
MIMO Multiple Input Multiple Output
MME Mobility Management Entity
MRW Move Receiving Window
MSB Most Significant Bit
MSCH MBMS point-to-multipoint Scheduling CHannel
MTCH MBMS point-to-multipoint Traffic Channel
NAS Non-Access Stratum
OFDM Orthogonal Frequency Division Multiplex
PBCH Physical Broadcast CHannel
PCCH Paging Control CHannel
PCH Paging CHannel
PDCCH Physical Downlink Control Channel
PDSCH Physical Downlink Shared Channel PDU Protocol Data Unit
PFSTD Precoded Frequency Switching Transmit Diversity
PHICH Physical HARQ Indicator CHannel
PHY PHYsical layer
PhyCH Physical Channels
PSC Primary Synchronization Channel
PUSCH Physical Uplink Shared Channel
PUCCH Physical Uplink Control Channel
PVS Precoding Vector Switch
QoS Quality of Service
RACH Random Access Channel
RAN Radio Access Network
RLC Radio Link Control
RRC Radio Resource Control
RS Received Signal
RX Receive
SCH Synchronization CHannel
SAP Service Access Point
SFBC Space-Frequency Block-Code
SSC Secondary Synchronization Channel
SDU Service Data Unit
SHCCH SHared channel Control CHannel
SN Sequence Number
SUFI SUper FIeld TCH Traffic CHannel
TDD Time Division Duplex
TFI Transport Format Indicator
TM Transparent Mode
TMD Transparent Mode Data
TTI Transmission Time Interval
TX Transmit
U- User-
UE User Equipment
UL UpLink
UM Unacknowledged Mode
UMB Ultra Mobile Broadband
UMD Unacknowledged Mode Data
UMTS Universal Mobile Telecommunications System
UTRA UMTS Terrestrial Radio Access
UTRAN UMTS Terrestrial Radio Access Network
VTSTD Virtual Time Switching Transmit Diversity
WCDMA Wideband Code Division Multiple Access
WWAN Wireless Wide Area Network In FIG. 10, a serving radio access network (RAN), depicted as an evolved base node (eNB) 600, has a computing platform 602 that provides means such as sets of codes for causing a computer to decode packet data units (PDUs). In particular, the computing platform 602 includes a computer readable storage medium (e.g., memory) 604 that stores a plurality of modules 606-608 executed by a processor(s) 620. A modulator 622 controlled by the processor 620 prepares a downlink signal for modulation by a transmitter 624, radiated by antenna(s) 626. A receiver 628 receives uplink signals from the antenna(s) 626 that are demodulated by a demodulator 630 and provided to the processor 620 for decoding. In particular, means (e.g., module, set of codes) 606 are provided for wirelessly receiving and storing a packet data unit (PDU) from a transmitting entity. Means (e.g., module, set of codes) 608 are provided for deterministically decoding segmentation and padding of service data units (SDUs) by predicting operation of a transmitting entity. A model 610 provides knowledge of how the transmitting entity builds the PDUs.

With continued reference to FIG. 10, a mobile station, depicted as user equipment (UE) 650, has a computing platform 652 that provides means such as sets of codes for causing a computer to build PDUs. In particular, the computing platform 652 includes a computer readable storage medium (e.g., memory) 654 that stores a plurality of modules 656-662 executed by a processor(s) 670. A modulator 672 controlled by the processor 670 prepares an uplink signal for modulation by a transmitter 674, radiated by antenna(s) 676 as depicted at 677 to the eNB 600. A receiver 678 receives downlink signals from the eNB 600 from the antenna(s) 676 that are demodulated by a demodulator 680 and provided to the processor 670 for decoding. In particular, means (e.g., module, set of codes) 656 are provided for receiving and storing service data units (SDUs). Means (e.g., module, set of codes) 658 are provided accessing a length value for a PDU to be built and a constraint value. Means (e.g., module, set of codes) 660 are provided sequentially assembling stored SDUs without exceeding the length value. Means (e.g., module, set of codes) 662 are provided for determining to perform one of segmenting a last SDU and padding the PDU to reach the length value based upon comparing a remaining portion of the PDU to the constraint value.

Figure 11:
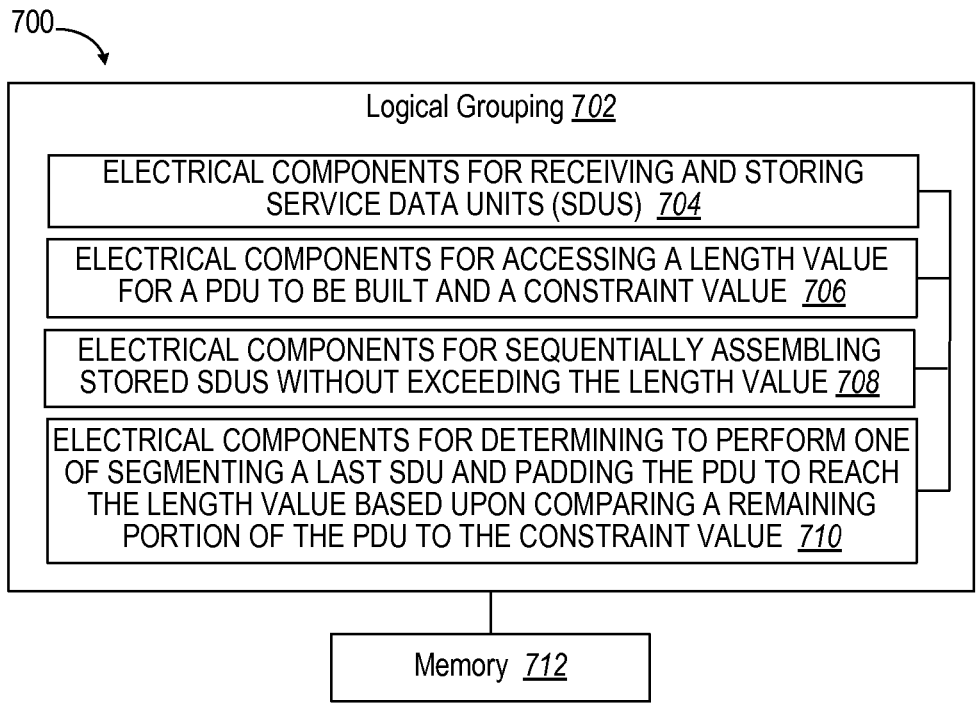
FIG. 11 illustrates a block diagram of a system comprising logical grouping of electrical components for deterministic segmentation, re-segmentation and padding.

With reference to FIG. 11, illustrated is a system 700 that enables building PDUs. For example, system 700 can reside at least partially within user equipment (UE). It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For instance, logical grouping 702 can include an electrical component for receiving and storing service data units (SDUs) 704. Moreover, logical grouping 702 can include an electrical component for accessing a length value for a PDU to be built and a constraint value 706. Further, logical grouping 702 can include an electrical component for sequentially assembling stored SDUs without exceeding the length value 708. In addition, logical grouping 702 can include an electrical component for determining to perform one of segmenting a last SDU and padding the PDU to reach the length value based upon comparing a remaining portion of the PDU to the constraint value 710. Additionally, system 700 can include a memory 712 that retains instructions for executing functions associated with electrical components 704 and 706. While shown as being external to memory 712, it is to be understood that one or more of electrical components 704, 706 and 708 can exist within memory 712.

Figure 12:
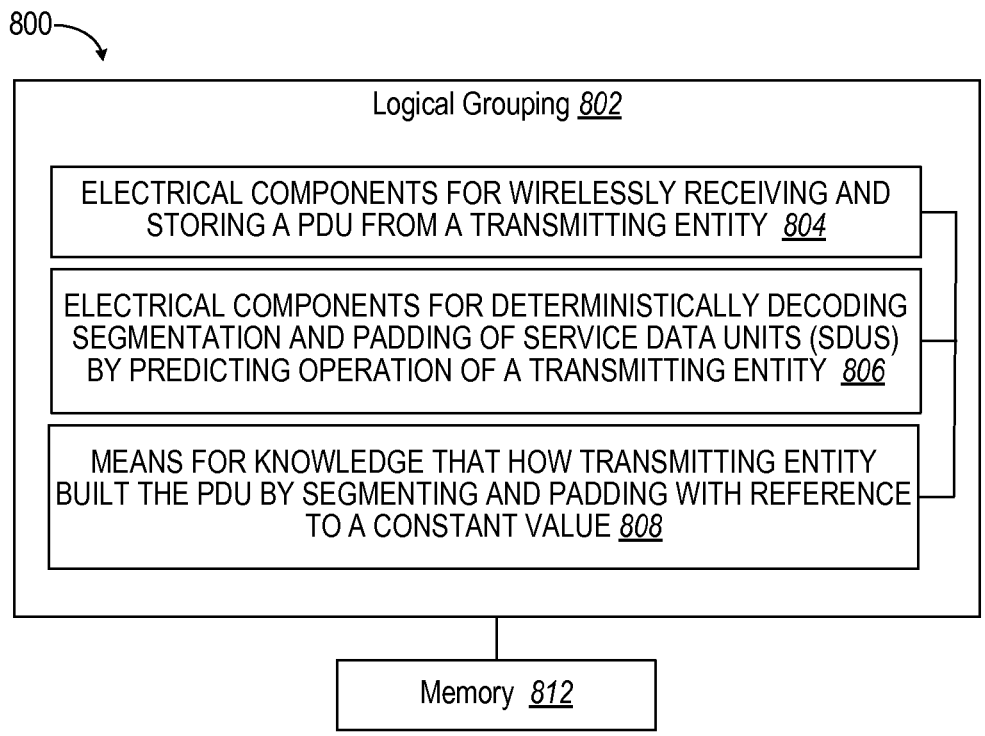
FIG. 12 illustrates a block diagram of a system comprising logical grouping of electrical components for deterministic segmentation, re-segmentation and padding.

With reference to FIG. 12, illustrated is a system 800 that enables assigning and enabling use of measurement gaps. For example, system 800 can reside at least partially within a base station. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for wirelessly receiving and storing a packet data unit (PDU) from a transmitting entity 804. In addition, logical grouping 802 can include an electrical component for deterministically decoding segmentation and padding of service data units (SDUs) by predicting operation of a transmitting entity 806. Further, logical grouping 802 can include an electrical component for containing a model for knowledge of how transmitting entity built the PDU 808. Additionally, system 800 can include a memory 812 that retains instructions for executing functions associated with electrical components 804, 806 and 808. While shown as being external to memory 812, it is to be understood that one or more of electrical components 804, 806 and 808 can exist within memory 812.

Figure 13:
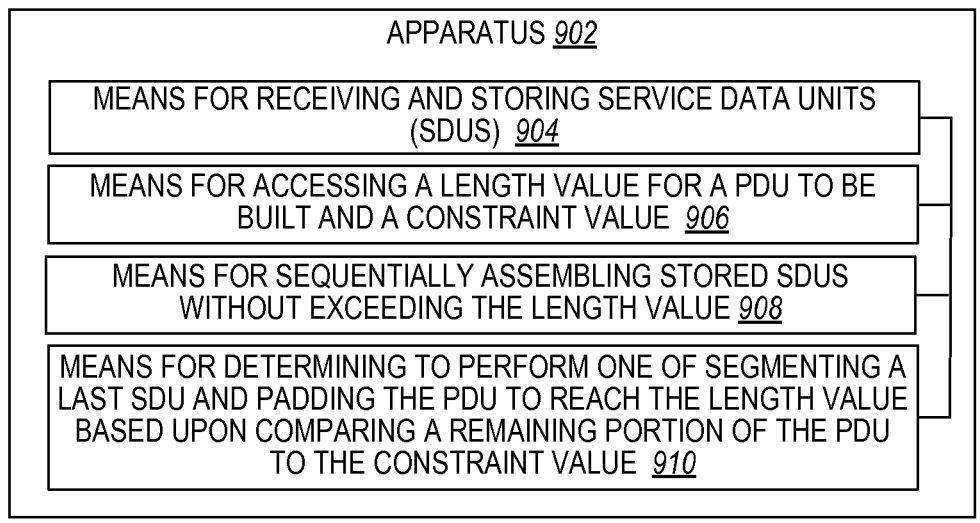
FIG. 13 illustrates a block diagram of an apparatus for building decoding packet data units (PDUs).

In FIG. 13, an apparatus 902 is depicted for building packet data units (PDUs). Means 904 are provided for receiving and storing service data units (SDUs). Means 906 are provided for accessing a length value for a PDU to be built and a constraint value. Means 908 are provided for sequentially assembling stored SDUs without exceeding the length value. Means 910 are provided for determining to perform one of segmenting a last SDU and padding the PDU to reach the length value based upon comparing a remaining portion of the PDU to the constraint value.

Figure 14:
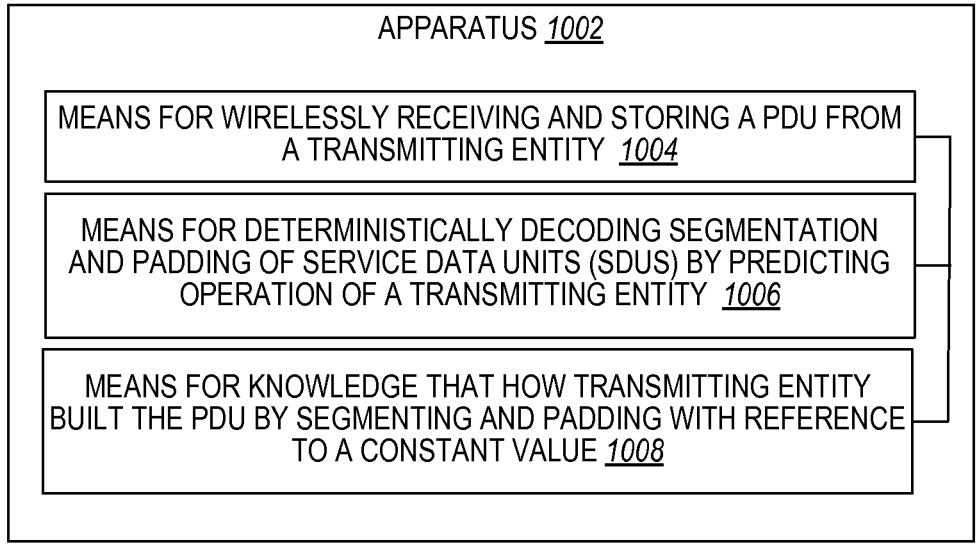
FIG. 14 illustrates a block diagram of an apparatus for decoding packet data units (PDUs).

In FIG. 14, an apparatus 1002 is depicted for decoding packet data units (PDUs). Means 1004 are provided for wirelessly receiving and storing a packet data unit (PDU) from a transmitting entity. Means 1006 are provided for deterministically decoding segmentation and padding of service data units (SDUs) by predicting operation of a transmitting entity. Means 1008 are provided for knowledge of how the transmitting entity is known to have built the PDU by receiving and storing service data units (SDUs), accessing a length value for a PDU to be built and a constraint value, sequentially assembling stored SDUs without exceeding the length value, and determining to perform one of segmenting a last SDU and padding the PDU to reach the length value based upon comparing a remaining portion of the PDU to the constraint value.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the evolved RAN (e.g., access point, eNode B) can infer or predict when a robust or augmented check field has been employed.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for building packet data units (PDUs) comprising:

receiving and storing service data units (SDUs);

assessing a length value for a PDU to be built and a constraint value;
storing SDUs without exceeding the length value; and
determining whether to perform segmenting on a last SDU based on comparing a remaining portion of the PDU to the constraint value.

2. The method of claim 1, wherein the constraint value indicates a minimum segmentation size allowed.

3. The method of claim 1, wherein determining whether to perform segmenting comprises:
avoiding segmentation on the last SDU when the last SDU fits into the remaining portion of the PDU.

4. The method of claim 1, further comprising:
comparing an available grant for a radio link control (RLC) instance to the constraint value.

5. The method of claim 4, further comprising:
transmitting all SDUs belonging to the same RLC instance in the same PDU without exceeding the length value.

6. The method of claim 1, further comprising:
avoiding segmentation when a segmented payload length is less than a maximum padding allowed.

7. A non-transitory computer-readable medium for building packet data units (PDUs) having code stored thereon, the code executable by one or more processors for:
receiving and storing service data units (SDUs);
assessing a length value for a PDU to be built and a constraint value;
storing SDUs without exceeding the length value; and
determining whether to perform segmenting on a last SDU based on comparing a remaining portion of the PDU to the constraint value.

8. The non-transitory computer-readable medium of claim 7, wherein the constraint value indicates a minimum segmentation size allowed.

9. The non-transitory computer-readable medium of claim 7, wherein the code for determining whether to perform segmenting comprises:
code for avoiding segmentation on the last SDU when the last SDU fits into the remaining portion of the PDU.

10. The non-transitory computer-readable medium of claim 7, further comprising:
code for comparing an available grant for a radio link control (RLC) instance to the constraint value.

11. The non-transitory computer-readable medium of claim 10, further comprising:
code for transmitting all SDUs belonging to the same RLC instance in the same PDU without exceeding the length value.

12. The non-transitory computer-readable medium of claim 7, further comprising:
code for avoiding segmentation when a segmented payload length is less than a maximum padding allowed.

13. An apparatus for building packet data units (PDUs) comprising:
means for receiving and storing service data units (SDUs);
means for assessing a length value for a PDU to be built and a constraint value;
means for storing SDUs without exceeding the length value; and
means for determining whether to perform segmenting on a last SDU based on comparing a remaining portion of the PDU to the constraint value.

14. The apparatus of claim 13, wherein the constraint value indicates a minimum segmentation size allowed.

15. The apparatus of claim 13, wherein the means for determining whether to perform segmenting comprises:
means for avoiding segmentation on the last SDU when the last SDU fits into the remaining portion of the PDU.

16. The apparatus of claim 13, further comprising:
means for comparing an available grant for a radio link control (RLC) instance to the constraint value.

17. The apparatus, of claim 16, further comprising:
means for transmitting all SDUs belonging to the same RLC instance in the same PDU without exceeding the length value.

18. The apparatus of claim 13, further comprising:
means for avoiding segmentation when a segmented payload length is less than a maximum padding allowed.

19. An apparatus for building packet data units (PDUs) comprising:
a memory for receiving and storing service data units (SDUs); and
a computing platform for assessing a length value for a PDU to be built and a constraint value, for storing SDUs without exceeding the length value, and for determining whether to perform segmenting on a last SDU based on comparing a remaining portion of the PDU to the constraint value.

20. The apparatus of claim 19, wherein the constraint value indicates a minimum segmentation size allowed.

21. The apparatus of claim 19, wherein determining whether to perform segmenting comprises:
avoiding segmentation on the last SDU when the last SDU fits into the remaining portion of the PDU.

22. The apparatus of claim 19, wherein the computing platform is further for comparing an available grant for a radio link control (RLC) instance to the constraint value.

23. The apparatus, of claim 22, wherein the computing platform is further for transmitting all SDUs belonging to the same RLC instance in the same PDU without exceeding the length value.

24. The apparatus of claim 19, wherein the computing platform is further for avoiding segmentation when a segmented payload length is less than a maximum padding allowed.

* * * * *